Aug. 5, 1969  A. KOVAŘÍK ET AL  3,459,476
AUTOMATICALLY OPERATED SLIDE PROJECTOR
Filed May 31, 1967  2 Sheets-Sheet 2

INVENTORS
Alois Kovařík, Jindřich
BY  Suchánek
Richard Low
Agt

United States Patent Office 3,459,476
Patented Aug. 5, 1969

3,459,476
AUTOMATICALLY OPERATED SLIDE PROJECTOR
Alois Kovářík, Prague, and Jindřich Suchanek, Brno, Czechoslovakia, assignors to MEOPTA, narodni podnik, Prerov, Czechoslovakia
Filed May 31, 1967, Ser. No. 642,532
Claims priority, application Czechoslovakia, June 2, 1966, 3,738/66
Int. Cl. G03b 21/14
U.S. Cl. 353—118                                  8 Claims

ABSTRACT OF THE DISCLOSURE

A slide projector has a magazine whose individual, pivotally mounted slide pockets are fed by gravity into the optical axis of the projector and lifted back into the magazine between indexing movements of the latter. A threaded drum rotates continuously and is shifted back and forth by a partly helical cam having the same pitch as the threads. Lugs projecting from inoperative pockets into the threads thus remain stationary during backward drum movement, and the magazine is shifted forward with the drum. A lifting face on the drum engages the lug of an operative pocket for return to the inoperative position.

BACKGROUND OF THE INVENTION

This invention relates to automatically operated slide projectors, and particularly to the slide changing mechanism for a projector equipped with a magazine.

In several copending applications, we have disclosed magazines having pivotally mounted pockets for individual slides which move between an inoperative position in which all pockets form a stack on the magazine body and an operative position in the optical axis of the projector, and projectors having dual optical systems, the operation of such projectors being improved by the use of the magazines.

While projectors with two optical systems have numerous advantages, particularly by permitting a sequential showing of projected images without intervening periods in which the projection screen remains dark, they are relatively complex and their cost is not usually warranted except for commercial or institutional use.

The object of the present invention is the provision of a relatively simple projector not requiring more than one optical system, yet benefitting from the advantages of the afore-described type of magazine.

SUMMARY OF THE INVENTION

The projector of the invention is equipped with guides which lead a magazine of the type described above in the normally horizontal direction of the optical axis of the projector lens system. The axially spaced planes in which the individual slide pockets pivot are thus transverse of the optical axis, and the pockets are normally upwardly offset from the optical axis when in the inoperative position. They are retained in the inoperative position when not aligned with a receptacle in the supporting structure of the projector which extends in the focal plane of the optical system, and are permitted to move into the operative position in the receptacle under the force of gravity when aligned with the receptacle.

Means are provided for lifting a pocket from the receptacle into its inoperative position, and for shifting the magazine along the guides in an axial direction over a distance corresponding to the spacing of the pivoting planes of the pockets. A common drive operates the lifting and shifting means in a timed cyclical sequence in such a manner that the magazine is shifted only after the lifting of a pocket from the receptacle.

The preferred shifting mechanism includes a drum rotated about its axis by the drive and provided with a coaxial helical thread which is engaged by elements of the magazine. The drum is axially moved between two positions during each revolution at a rate sufficient substantially to maintain the axial position of the thread engaging elements, and for thereafter returning the drum to its original axial position together with the magazine.

A lifting face on the drum engages a lug on a pocket in the receptacle for lifting the pocket into its inoperative position while the axial position of the thread-engaging elements is being maintained.

Other features, additional objects, and many of the attendant advantages of this invention will be readily appreciated as the same becomes better understood by reference to the following detailed description of a preferred embodiment when considered in connection with the accompanying drawings.

DESCRIPTION OF THE PREFERRED EMBODIMENT

Figure 1:
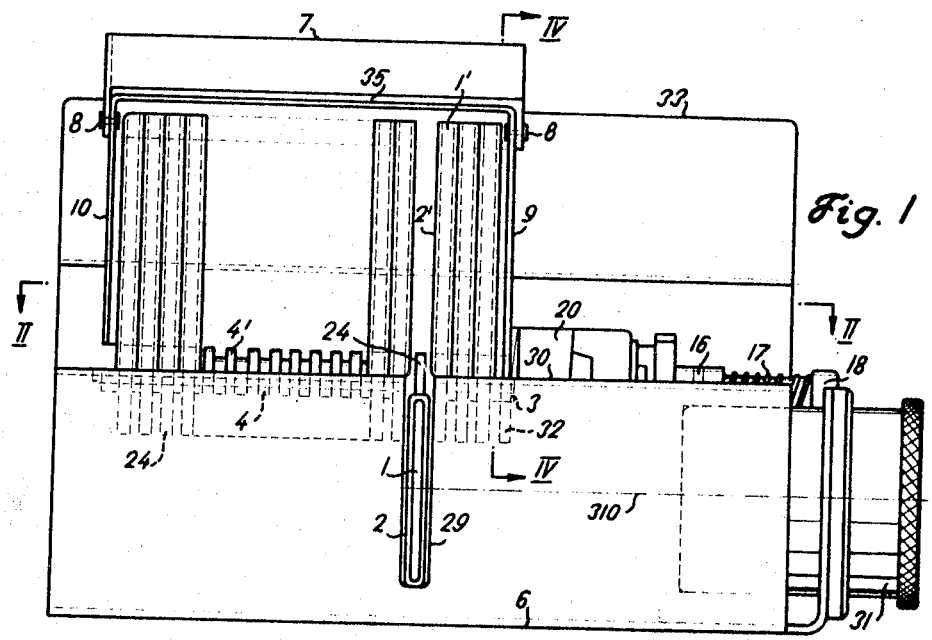
FIG. 1 shows an automatic slide projector of the invention in side elevation.

The projector illustrated has a sheet metal housing 6 on which and in which the operating elements of the projector are supported. The lower part of the housing accommodates the optical system of the projector of which only a barrel-mounted lens 31 on the front end of the housing 6 has been shown. A light source including an electric lamp, a condenser, heat absorbing filters, and a shutter has been omitted from the drawings since they may be entirely conventional, and not directly relevant to this invention.

An upright guide wall 33 and a horizontal retaining wall 30 of the housing which are parallel to the optical axis 310 of the lens 31 support a slide magazine and axially guide its movement. The magazine has two axial walls 4 and 35 of sheet material which are joined at right angles, and its axial ends are closed by transverse end walls 9, 10, the walls 4, 35, 9, and 10 constituting the body of the magazine. When the magazine is in its operating position on the projector housing, an axially elongated channel 5 integral with the wall 4 near its junction with the wall 35 is hooked over the free top edge of the guide wall 33, as is best seen in FIG. 3, so that the magazine wall 4 is upright, and the wall 35 provides a horizontal cover.

The lower edge of the wall 4 has eighteen uniformly spaced notches 4', and the tongues of sheet material separated by the notches are looped about a shaft 3 which extends over the full axial length of the magazine. Each portion of the shaft 3 exposed in a notch 4' carries a flat apertured slide pocket 2, 2', 2'', etc., not all eighteen pockets having been shown in the drawing for the sake of clarity.

The pockets consist of two rectangular sheet metal frames which are spacedly superimposed to accommodate conventionally mounted transparencies or slides 1, 1', 1'' therebetween and are connected along the two longer sides and one narrow side of the rectangle, the other narrow side being open to permit insertion and withdrawal of slides. An apertured lug 24 projects approximately diagonally outward from a corner of each pocket at the closed narrow side, and the shaft 3 rotatably passes through the aperture in the lug which tapers from the shaft to a rounded free end 23. When the slides are stored in the magazine, the pockets are retained in the corner between the wall 4 and the cover 35 by a strap 7 twice bent at right angles into a low U-shape. The ends of the strap are pivotally attached to the end walls 9, 10 respectively by studs 8, and the main portion of the strap 7 extends along the pockets 2 opposite the wall 4.

Figure 3:
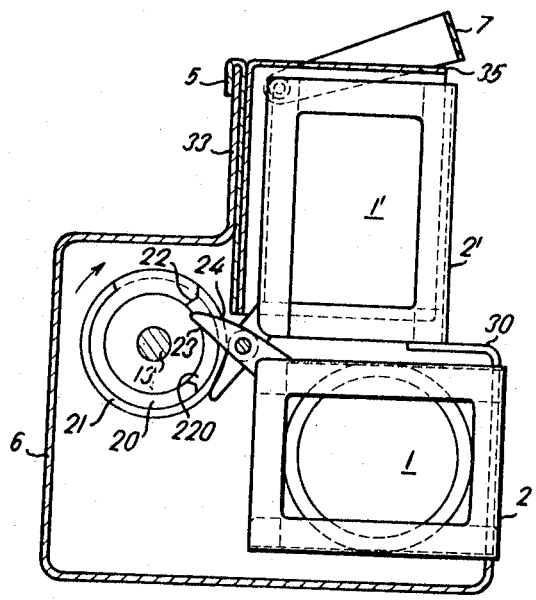
FIG. 3 shows the same projector in rear elevational section on the line III—III in FIG. 2.
Figure 4:
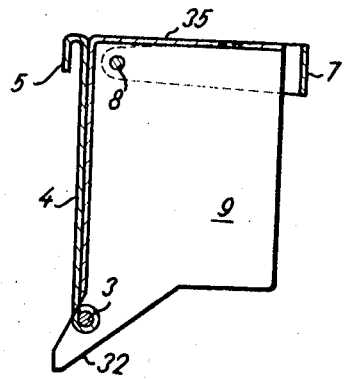
FIG. 4 shows the slide magazine of the projector in section on the line IV—IV of FIG. 1.

When the magazine is suspended on the housing wall 33 by means of the channel 5, the corners of most pockets diagonally opposite the channel rest on the horizontal retaining wall 30 in an inoperative position occupied by the pocket 2′ in FIG. 3. The strap is swung up above the cover 35 on the studs 8. A slot 34 in the horizontal housing wall 30 and a corresponding slot 29 in a contiguously adjacent upright axial wall of the housing 6 define a receptacle for the pocket 2 which, lacking the support of the wall 30, pivots on the shaft 3 and drops into the position shown in the drawing in which the slide 1 intersects the optical axis 310 in the focal plane of the lens 31.

Figure 2:
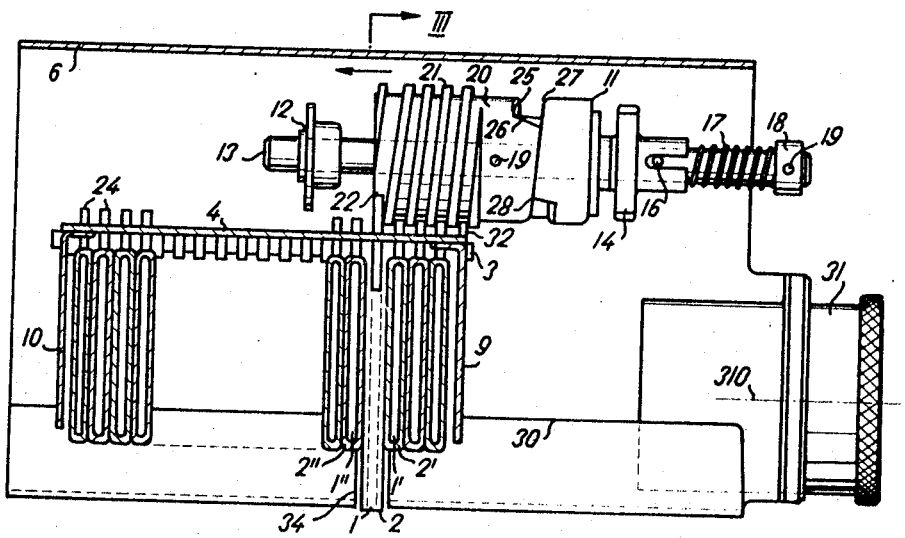
FIG. 2 shows the projector of FIG. 1 in plan section on the line II—II.

The slide changing mechanism of the projector is best seen in FIG. 2. A shaft 13 is slidably and rotatably supported in two bearings 11, 12 fixedly mounted on the housing 6. A collar 18 and a drum 20 are fixedly fastened to the shaft 13 by transverse pins 19, the drum being arranged between the bearings 11, 12, and the collar on the free end of the shaft outside the bearing 11.

A spur gear 14 having an axially slotted hub 15 is axially slidable on the shaft 13 between the bearing 11 and the collar 18, but is secured against rotation by a pin 16 radially projecting from the shaft 13 into the slot of the hub 15. A helical compression spring 17 interposed beteen the gear 14 and the collar 18 holds the gear in a fixed axial position contiguously adjacent the bearing 11 and biases the shaft 13 toward the right, or forward, as viewed in FIG. 2.

The bearing 11 and the drum 20 have mating opposite cam faces. The face of the drum 20 has a helical portion 25 which extends almost in a full turn about the axis of the shaft 13 and whose ends are connected by a short, steep cam face portion 26. The bearing 11 has a corresponding helical face portion 27, and a steeply sloping face portion 28. A square thread 21 on the drum 20 has the same pitch as the cam faces 25, 27, the pitch being identical with the uniform axial spacing of the planes in which the pockets 2, 2′, 2″, etc. of the slide magazine pivot on the shaft 3, and the grooves between the turns of the thread 21 being dimensioned to receive the free ends 23 of the lugs 24 on the pocket which are located forwardly of the pocket 2. At the end of the thread 21 near the bearing 12, the drum 20 has an opening 220 (FIG. 3) so that the thread terminates with a rounded lifting face 22 partly extending along a radius of the drum 20.

The non-illustrated electric drive motor of the projector continuously rotates a drive gear (not shown) meshing with the gear 14 while the projector operates.

When the projector and the magazine are in the condition illustrated in the drawing, the slide 1′ in the pocket 2′ was previously projected and has been returned to its inoperative position on the retaining wall 30, and the slide 1 in the pocket 2 is being projected while in the operative position.

As the drum 20 is being rotated by the gear 14 in a clockwise direction, as viewed in FIG. 3, the lifting face 22 abuts against the free end 23 of the lug 24 on the pocket 2 and swings the pocket on the shaft 3 counterclockwise to lift the same from the receptacle 29, 34. Because of the camming engagement of the face portions 25, 27, the several lugs 24 which engage the grooves in the thread 21 do not move axially during the lifting step but the drum 20 and the shaft 13 move helically toward the bearing 12 against the restraint of the spring 17.

When the pocket 2 has been lifted above the wall 30, the steeply sloping cam face portion 26, 28 reach a position of axial alignment, and the drum 30 is abruptly shifted toward the bearing 11 by the spring 17, taking the magazine with it. The pocket 2″ is thereby aligned with the slots 29, 34 and drops into the receptacle of the optical system for projection of its slide 1″. A new cycle now begins, and the same sequence of steps is repeated until the last slide in the magazine has been projected.

In order to facilitate the starting of a fresh magazine, the end wall 9 has a fixed lug 32 substantially identical with the lugs 24 which travels in the groove of the thread 21 in the same manner as the lugs 24.

The non-illustrated shutter of the light source prevents light from passing through the lens 31 while a transparency is not present in the receptacle 29, 34, as is conventional in slide projectors.

Obviously, many modifications and variations of the present invention are possible in the light of the above teachings. It is therefore to be understood that, within the scope of the appended claims, the invention may be practiced otherwise than as specifically disclosed.

We claim:
1. In a slide projector, in combination:
 (a) a support;
 (b) lens means on said support defining an optical axis and a focal plane transverse of said axis, said axis extending horizontally in the normal operating position of the projector,
  (1) said support being formed with receptacle means extending substantially in said plane;
 (c) a slide magazine including a body portion and a plurality of pocket portions mounted on said body portion for movement about a pivot axis between respective operative and inoperative positions in axially spaced planes;
 (d) guide means on said support for guiding said magazine in a path extending in the direction of said optical exis, said axially spaced planes being transverse of said optical axis and said pocket portions being normally upwardly offset from said optical axis when the magazine is being guided by said guide means and the pocket portions are in the inoperative position thereof;
 (e) retaining means for retaining said pocket portions in said inoperative position when not aligned with said receptacle means while permitting an aligned pocket portion to move into the operative position thereof in said receptacle means under the force of gravity;
 (f) lifting means for lifting a pocket portion from said receptacle means toward said inoperative position thereof;
 (g) magazine shifting means for shifting said magazine on said guide means in said direction a distance corresponding to the axial spacing of said planes; and
 (h) drive means for operating said retaining means and said lifting means in a timed cyclical sequence in which said shifting means shift said magazine after the lifting of a pocket portion for said receptacle means.

2. In a projector as set forth in claim 1, said shifting means including a drum member mounted on said support for movement about an axis of rotation extending in said direction, said drive means including means for continuously rotating said drum member about said axis of rotation, a helical thread on said drum member about the axis of rotation, thread-engaging means on said magazine for engaging said thread while said magazine is being guided in said path, and cam means for moving said drum member from one axial position to another axial position during each revolution thereof at a rate sufficient substantially to maintain the axial position of said thread-engaging means, and for thereafter shifting said drum member from said other axial position to said one axial position, said lifting means lifting said pocket portion from said receptacle means while the axial position of said thread-engaging means is substantially maintained.

3. In a projector as set forth in claim 2, said lifting means including a lifting face on said drum member and lug means extending radially relative to said pivot axis on each pocket portion, said lug means being engaged by said lifting face during rotation of said drum member when the associated pocket portion is in said operative position thereof in said receptacle means.

4. In a projector as set forth in claim 3, each lug means constituting a portion of said thread-engaging means in the inoperative position of the associated pocket portion.

5. In a projector as set forth in claim 2, said cam means including a cam member fixedly mounted on said support and having a cam face, another cam face on said drum member, and means biasing said cam faces toward enaggement with each other in the direction of said axis of rotation.

6. In a projector as set forth in claim 5, one of said cam faces having a helical portion about said axis of rotation, the axial spacing of the ends of said helical portion corresponding to the axial spacing of said planes.

7. In a projector as set forth in claim 6, the other cam face having a helical portion matingly engageable with the helical portion of said one cam face.

8. In a projector as set forth in claim 5, said cam member being formed with a bearing about said axis of rotation, a shaft received in said bearing for rotation and axial movement, said drum member being mounted on said shaft.

References Cited

UNITED STATES PATENTS

| | | | |
|---|---|---|---|
| 3,146,666 | 9/1964 | Misuraca | 353—111 |
| 3,171,222 | 3/1965 | Sakaki et al. | 353—118 |
| 3,174,395 | 3/1965 | Krull | 353—118 |
| 3,276,314 | 10/1966 | Robinson | 353—111 |
| 3,336,836 | 8/1967 | Gould et al. | 353—111 |

NORTON ANSHER, Primary Examiner

R. M. SHEER, Assistant Examiner

U.S. Cl. X.R.

353—111, 116